United States Patent [19]

Komiya et al.

[11] Patent Number: 4,816,544

[45] Date of Patent: Mar. 28, 1989

[54] POLYAMIDEIMIDE ELASTOMER AND PRODUCTION THEREOF

[75] Inventors: Yukiatsu Komiya; Masao Ishida; Koji Hirai, all of Kurashiki; Takuji Okaya, Kyoto, all of Japan

[73] Assignee: Kuraray Co., Ltd., Kurashiki, Japan

[21] Appl. No.: 192,629

[22] Filed: May 11, 1988

[30] Foreign Application Priority Data

May 19, 1987 [JP] Japan ................................. 62-123394

[51] Int. Cl.$^4$ ............................................. C08G 18/28
[52] U.S. Cl. ....................................................... 528/73
[58] Field of Search ........................................... 528/73

[56] References Cited

U.S. PATENT DOCUMENTS 4,496,715 1/1985 Sattler .................................... 528/73

Primary Examiner—Maurice J. Welsh
Attorney, Agent, or Firm—Oblon, Fisher, Spivak, McClelland & Maier

[57] ABSTRACT

Disclosed are novel polyamideimide elastomers obtained by reaction of carboxyl-telechelic polymer(s) having a molecular weight of 500 to 10,000 aromatic diisocyanate(s), trimellitic acid anhydride and a dicarboxylic acid having 4 to 18 carbon atoms in a particular proportion. The polyamideimide elastomers have excellent heat resistance, oil resistance and low temperature characteristics and have mechanical properties which are comparable to those of polyurethane elastomers. Further, the said elastomers have a particular characteristic that they may retain a rubber-like property even at a high temperature.

34 Claims, 2 Drawing Sheets

POLYAMIDEIMIDE ELASTOMER AND PRODUCTION THEREOF

BACKGROUND OF THE INVENTION

1. Field of the Invention

The present invention relates to novel polyamideimide elastomers showing excellent heat resistance and mechanical properties as well as excellent low temperature characteristics and oil resistance.

2. Description of the Prior Art

Production of polyamide, polyimide or polyamideimide resins has been proposed, by reacting an organic isocyanate and a component selected from the group consisting of an organic carboxylic acid and an organic carboxylic acid anhydride in the presence of a phosphorene compound of a certain kind as a catalyst. (For example, refer to U.S. Pat. Nos. 4,156,065 and 4,078,481.) Utilizing the said reaction, U.S. Pat. No. 4,129,715 has proposed polyester-polyamide elastomers which contain a hard segment in the aromatic ring moiety and which can be processed by injection moulding, from a carboxyltelechelic polymer and an aromatic diisocyanate. The said polyester-polyamide elastomers have excellent heat resistance, oil resistance and low temperature characteristics.

SUMMARY OF THE INVENTION

The above-mentioned polyester-polyamide elastomers are inferior to polyurethane elastomers with respect to the mechanical properties, although the former have the excellent properties as mentioned above. It is the object of the present invention to provide polyamideimide elastomers having excellent mechanical properties which are comparable to polyurethane elastomers, without impairing the intrinsic heat resistance, oil resistance, low temperature characteristics and the like excellent properties of conventional polyester polyamide elastomers.

As a result of extensive investigations to achieve the foregoing object, the present inventors have surprisingly discovered that by substitution of a part or all of the dicarboxylic acids with from 4 to 18 carbon atoms for forming the high boiling point hard segment of a polyester polyamide elastomer by trimellitic anhydride, polyamideimide elastomers having mechanical properties which are comparable to or more than those of polyurethane elastomers can be obtained and thus have achieved the present invention. The said polyamideimide elastomers have been characterized to have particular properties that the elastomers may retain the rubber like elasticity even at a fairly high temperature. Further, it has been found that the elastic recovery of the polyamideimide elastomers of the present invention can noticeably be improved by introduction of a side chain structure into the soft segment thereof.

Accordingly, the first embodiment of the present invention is to provide polyamideimide elastomers substantially comprising structural units of the following (I) through (IV) and having a number average molecular weight of 5,000 or more.

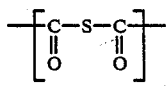

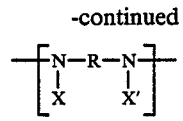

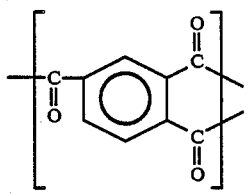

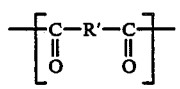

wherein S represents a divalent group derived from one or more carboxyl-telechelic polymers having a molecular weight of 500 to 10,000, by removing the carboxyl groups therefrom; R represents a residue of one or more aromatic hydrocarbons; X and X' each represent a hydrogen atom or a bond, and in the case of a bond, this is bonded to the structural unit (III) to form an imide ring; R' represents a divalent group derived from one or more dicarboxylic acids having 4 to 18 carbon atoms, by removing the carboxyl groups therefrom; and wherein the units (I), (III) and (IV) are necessarily bonded to each other via the structural unit (II), the unit (III) is bonded to the unit (II) to form an imido ring, the total molar number of the units (I)+(III)+(IV) in the said polyamideimide elastomer is substantially equal to the molar number of the unit (II), the unit (I) is 3 to 49 mol % and the sum of the units (III)+(IV) is 1 to 47 mol % on the basis of the total of the units (I) through (IV) of being 100 mol %, and the molar ratio of (III)/(IV) is 100/0 to 10/90.

The second embodiment of the present invention is to provide a method of producing polyamideimide elastomers by reacting the following components:

(a) one or more carboxyl-telechelic polymers having a molecular weight of 500 to 10,000,
(b) one or more aromatic organic diisocyanates,
(c) trimellitic anhydride, and
(d) a dicarboxylic acid having 4 to 18 carbon atoms, in a molar ratio of (c)/(d) of being 10/90 to 100/0.

DETAILED DESCRIPTION OF THE PREFERRED EMBODIMENTS

Figure 1:
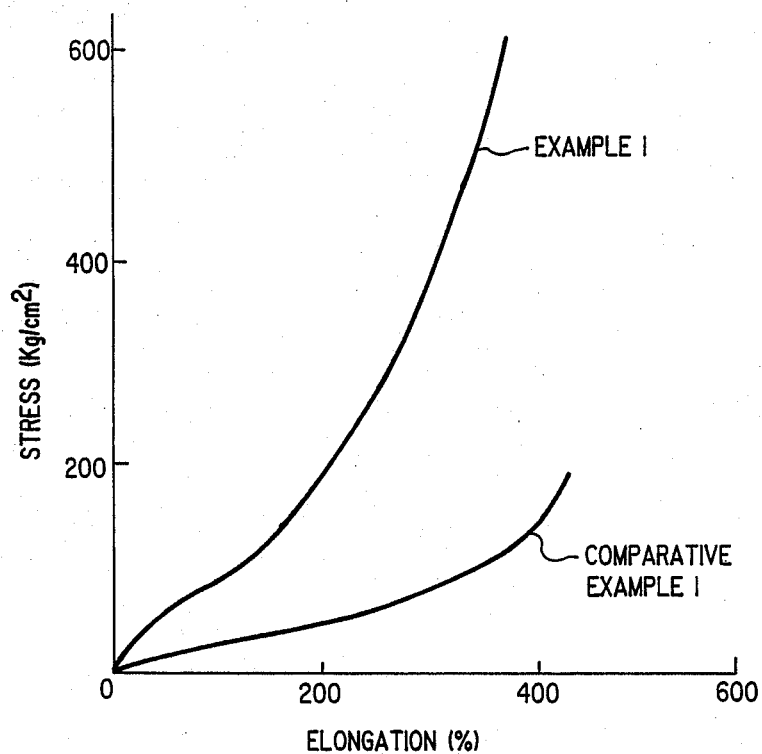
FIG. 1 shows a graph of stress-elongation curve of the polyamideimide elastomer obtained in Example 1 together with that of the polyamide elastomer of Comparative Example 1.

In accordance with the present invention, the structural unit as represented by the formula (I) is one derived from a carboxyl-telechelic polymer and this constitutes the soft segment of the polyamideimide elastomer of the present invention. In the unit (I), S represents a divalent group derived from one or more carboxyl-telechelic polymers having a molecular weight of 500 to 10,000, by removing the carboxyl groups therefrom. The carboxyl-telechelic polymer is a polymer having carboxyl groups in the both terminals.

As the carboxyl-telechelic polymer can be used various polymers of polyesters, polycarbonates, polyethers, polyether-polyesters, polyester-polycarbonates and the like having carboxyl groups in the both terminals, singly or in the form of a mixture of the polymers.

The carboxyl-telechelic polymers can be obtained, for example, by reacting an excess amount of a dicarboxylic acid (the amount of which is determined in accordance with the intended final molecular weight of the polymer to be obtained) and a low molecular weight diol or a polymeric diol.

The dicarboxylic acid which is reacted with the above-mentioned low molecular weight diol or polymeric diol in an excess amount for preparing carboxyl-telechelic polymers includes, for example, aliphatic dicarboxylic acids having 4 to 18 carbon atoms, such as succinic acid, glutaric acid, adipic acid, suberic acid, azelaic acid, sebacic acid, 1,10-decanedicarboxylic acid and the like, and aromatic dicarboxylic acids having 8 to 18 carbon atoms, such as terephthalic acid, isophthalic acid, phthalic acid, naphthalene-dicarboxylic acid and the like. These dicarboxylic acids may be used alone or in combination.

The low molecular weight diol includes, for example, aliphatic diols having 2 to 20 carbon atoms, such as ethylene glycol, propylene glycol, 1,4-butanediol, 1,3-butylene glycol, 2-methyl-1,3-propanediol, neopentyl glycol, 3-methyl-1,5-pentanediol, 1,6-hexanediol, 2,2-diethyl-1,3-propanediol, 2-ethyl-1,3-hexanediol, 3,3-dimethylolheptane, 1,9-nonanediol, 2-methyl-1,8-octanediol, 1,10-decanediol, etc. These may be used alone or in combination.

The polymeric diol includes, for example, polyether-diols, polyester-diols, polycarbonate-diols and the like having a molecular weight of 300 to 8,000, which, however, are not limitative.

Polyether-diols are polyalkylene glycols, such as polyethylene glycol, polypropylene glycol, polytetramethylene glycol, ethyleneoxide-capped polypropylene glycol and the like, which are obtained by polymerization of one or more cyclic ethers such as ethyleneoxide, propyleneoxide, tetrahydrofuran and the like.

Polyester-diols include those obtained by polycondensation of one or more aliphatic dicarboxylic acids having 4 to 18 carbon atoms, such as succinic acid, methylsuccinic acid, 2,3-dimethylsuccinic acid, glutaric acid, adipic acid, suberic acid, 2-methyl-1,8-suberic acid, azelaic acid, sebacic acid, 1,10-decanedicarboxylic acid and the like, and one or more of the aforesaid low molecular diols, such as ethylene glycol, propylene glycol and the like, and those obtained by ring-opening-polymerization of lactones such as ε-caprolactone, δ-valerolactone, β-methyl-δ-valerolactone and the like.

Polycarbonate-diols are obtained, for example, by polycondensation of carbonate compounds, such as diphenyl carbonate, diethyl carbonate, ethylene carbonate, propylene carbonate and the like, and one or more of the aforesaid low molecular diols, such as 1,4-butanediol, 1,6-hexanediol, 3-methyl-1,5-pentanediol, 1,9-nonanediol, 2-methyl-1,8-octanediol, diethylene glycol and the like.

In the practice of the present invention, the terminal carboxylation is not limited to only the above-mentioned methods but any other known methods can be applied thereto. For instance, a polymeric diol may be reacted with an acid anhydride such as succinic anhydride or the like under heat for terminal carboxylation.

The carboxyl-telechelic polymers for use in the present invention have a molecular weight of 500 to 10,000. When the molecular weight is less than 500, the heat resistance, flexibility and low temperature characteristics of the resulting elastomers would be poor. On the other hand, when it exceeds 10,000, the mechanical properties of the resulting elastomers would be poor. In the elastomers of the present invention, if the mechanical properties, heat resistance and oil resistance are especially important, the carboxyl-telechelic polymer to be used is preferably a polyester or polycarbonate having a molecular weight of 800 to 5,000. When polyester and/or polycarbonate carboxyl-telechelic polymers are used, elastomers which are especially excellent in the heat resistance can be obtained, as compared with the case where polyether carboxyl-telechelic polymers are used.

In accordance with the present invention, when a polymer having a side chain in the molecule is used as the carboxyl-telechelic polymer, it is possible to especially improve the elastic recovery of the resulting elastomers, with sufficiently retaining the mechanical properties thereof. The side chain-containing carboxyl-telechelic polymer for the purpose can be obtained by selecting side chain-containing compounds for the above-mentioned low molecular diol or dicarboxylic acid or lactone. The amount of the side chain-containing low molecular diol or dicarboxylic acid necessary for attaining the excellent elastic recovery widely varies in accordance with the kinds of the low molecular diol and dicarboxylic acid to be used as well as the combination thereof.

For example, when a side chain-containing polyester is to be produced as the carboxyl-telechelic polymer, the proportion of the side chain-containing low molecular diol (A mol) and the side chain-containing dicarboxylic acid (B mol) to the total of the side chain-containing low molecular diol (A mol), the side chain-containing dicarboxylic acid (B mol), and a linear chain low molecular diol (C mol) and a linear chain dicarboxylic acid (D mol) (which is represented by a formula of $(A+B)/(A+B+C+D)\times 100$ (%)) is preferably within the range of from 5 % to 100 %, especially preferably from 15 % to 100 %. In the case of the polyesters to be obtained by ring-opening-polymerization of lactones, the proportion of the side chain-containing lactone (E mol) to the total of the side chain-containing lactone (E mol) and a side chain-free lactone (F mol) (which is represented by a formula of $E/(E+F)\times 100$ (%)) is preferably within the range of from 5 % to 100 %, especially preferably from 15 % to 100 %.

When a side chain-containing polycarbonate is to be produced as the carboxyl-telechelic polymer, the proportion of the side chain-containing low molecular diol (G mol) to the total of the side chain-containing low molecular diol (G mol) and a linear chain low molecular diol (H mol) ( which is represented by a formula of $G/(G+H) \times 100$ (%)) is preferably within the range of from 5 % to 100 %, especially preferably from 15 % to 100 %.

When a side chain-containing polyether is to be produced as the carboxyl-telechelic polymer, the proportion of the side chain-containing cyclic ether (I mol) to the total of the side chain-containing cyclic ether (I mol) and a side chain-free cyclic ether (J mol) (which is represented by a formula of $I/(I+J)\times 100$ (%)) is preferably within the range of from 5 % to 100 %, especially preferably from 15 % to 100 %.

It is preferred to use a polyester as the carboxyl-telechelic polymer in the present invention, as mentioned above, and diols having the following structural formulae are preferably used as the low molecular diol component for producing side chain-containing polyesters for the purpose.

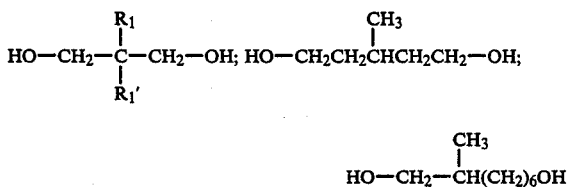

wherein $R_1$ and $R_1'$ each represent an alkyl group having 1 to 4 carbon atoms.

In particular, when low temperature characteristics, resistance to hydrolysis and flexibility are required, 3-methyl-1,5-pentanediol or 2-methyl-1,8-octanediol is preferably used. When heat resistance is required, neopentyl glycol, 2,2-diethyl-1,3-propanediol or the like diol is preferably used.

In the present invention, the structural unit as represented by the formula (II) is, for example, derived from a diisocyanate. In the unit (II), R represents a residue of one or more aromatic hydrocarbons; and X and X' each represent a hydrogen atom or a bond, and in the case of a bond, this is bonded to the structural unit (III) to form an imido ring. Examples of the compounds capable of giving the structural unit (II) include aromatic organic diisocyanates, for example, those having 8 to 24 carbon atoms, such as 4,4'-diphenylmethane diisocyanate, p-phenylene diisocyanate, tolylene diisocyanate, 1,5-naphthalene diisocyanate, etc. In particular, 4,4'-diphenylmethane diisocyanate and tolylene diisocyanate are more preferred among them.

In the present invention, the structural unit as represented by the formula (III) is derived from trimellitic anhydride. The unit (III) is necessarily bonded to the unit (II), and substantially all of the units (III) constitute imide bonds. Because of the presence of the said imide bonds, the excellent mechanical properties of the elastomers of the present invention can be attained.

In the present invention, the structural unit as represented by the formula (IV) is one derived from a dicarboxylic acid having 4 to 18 carbon atoms. In the unit (IV), R' represents a divalent group derived from the said dicarboxylic acid by removing the carboxyl groups therefrom. The dicarboxylic acids with 4 to 18 carbon atoms which may give the structural unit (IV) are not specifically limited but aliphatic dicarboxylic acids, alicyclic dicarboxylic acids and aromatic dicarboxylic acids can be illustrated therefor. The aliphatic dicarboxylic acids include, for example, succinic acid, glutaric acid, adipic acid, azelaic acid, sebacic acid and 1,10-decanedicarboxylic acid.

The aromatic dicarboxylic acids include, for example, those having 8 to 18 carbon atoms such as terephthalic acid, isophthalic acid, phthalic acid, naphthalenedicarboxylic acid, etc.

In the present invention, aliphatic dicarboxylic acids, especially those having 6 to 16 carbon atoms, are mentioned as preferred examples, and adipic acid, azelaic acid, sebacic acid and 1,10-decane-dicarboxylic acid are more preferred. These dicarboxylic acids can be used either alone or in combination.

In the polyamideimide elastomers of the present invention, the structural units (I), (III) and (IV) are bonded to each other necessarily via the unit (II), and the total molar number of the units (I)+(III)+(IV) in the said polyamideimide elastomer is substantially equal to the molar number of the unit (II). In the elastomer, the unit (I) is 3 to 49 mol % and the sum of the units (III)+(IV) is 1 to 47 mol %, on the basis of the total of the units of (I) through (IV) of being 100 mol %, and the molar ratio of the unit (III) to the unit (IV) ((III)/(IV)) is 100/0 to 10/90. The content of the unit (I) may widely vary in accordance with the molecular weight of the carboxyl-telechelic polymer used, but it is preferably within the range of from 7 to 35 mol %. If the content of the unit (I) is too small, the resulting elastomer would be difficult to show the properties as an elastomer. On the other hand, if the said content is too large, the resulting elastomer could hardly express the heat resistance.

The molar amount of the unit (I) to the total molar amount of (I), (III) and (IV) is preferably 10 to 90 mol %.

In the present invention, if the molar ratio of (III) to (IV) ((III)/(IV)) is less than 10/90, the mechanical properties and heat resistance of the resulting elastomers would be poor and so such molar ratio is unfavorable. More preferred molar ratio of (III)/(IV) is 30/70 to 100/0, and the ratio is especially preferably 50/50 to 100/0. When especially excellent mechanical properties and heat resistance are required, the structure unit (III) only, or that is, the molar ratio of being 100/0 is most preferred.

The polyamideimide elastomers of the present invention can be produced by reacting (a) one or more carboxyl-telechelic polymers having a molecular weight of 500 to 10,000, (b) one or more aromatic organic diisocyanates, (c) trimellitic acid anhydride and (d) a dicarboxylic acid having 4 to 18 carbon atoms, in a proportion of (a) of being 3 to 49 mol % on the basis of the total of (a) to (d) of being 100 mol %, a molar ratio of (c)/(d) of being 100/0 to 10/90, and a ratio of the molar number of (b) to the total molar number of (a), (c) and (d) of (b)/(a)+(c)+(d) of being from 0.97 to 1.1.

Regarding the ratio of (b)/(a)+(c)+(d), if this is less than 0.97, the polymerization degree would be insufficient and good mechanical properties could not be imparted to the resulting elastomers. Further, the resistance to hydrolysis would be poor since free carboxyl groups would remain in the elastomers. Therefore, such ratio is unfavorable. On the other hand, if the said ratio exceeds 1.1, the polymerization itself would become difficult because of gelation of the reaction components.

The production of the polyamideimide elastomers of the present invention can be conduced in the presence of a catalyst. In the production, any catalysts which are known in this technical field for reaction between isocyanato group and carboxylic acid group or acid anhydride group can be used, and preferred catalysts for the present invention include, for example, 1-phenyl-2-phosphorene-1-oxide, 1-methyl-2-phosphorene-1-oxide, 1-phenyl-2-phosphorene-1-sulfide, 1-ethyl-2-phosphorene-1-oxide, 1-ethyl-2-phosphorene-1-oxide, 1-phenyl-2-phosphorene-3-methyl-1-oxide, etc., which, however, are not limitative.

In accordance with the method of the present invention, amide bonds and imide bonds are formed by reaction of the said aromatic organic diisocyanate, carboxyl-telechelic polymer, trimellitic anhydride and dicarboxylic acid with 4 to 18 carbon atoms. The reaction can be conducted by mixing the necessary reaction components and a catalyst in the presence of an inert organic solvent and substantially in the absence of water, or alternatively, a hot-melt polymerization process can be employed where the reaction components are heated and blended in the absence of an inert organic solvent. The inert organic solvent herein referred to means an organic solvent which is inactive under the reaction condition, or that is, an organic solvent which reacts with neither the reaction components nor the catalyst and which does not impair the intended reaction procedure to a noticeable degree. Examples of such inert organic solvents include toluene, xylene, tetralin, tetrahydrofuran, dimethylsulfoxide, N,N-dimethylformamide, N,N-dimethylacetamide, N-methyl-2-pyrrolidone, tetramethylenesulfone, tetramethylurea, hexamethylphosphoramide, dioxane, etc.

In performing the reaction, the reaction temperature can be chosen from a broad range of 20° to 230° C., but it is preferably within the range of 100° to 290° C. in view of the reaction speed and the decomposition temperature of the product.

The number average molecular weight of the polyamideimide elastomer of the present invention is preferably 5,000 to 250,000, especially preferably 20,000 to 200,000. If the molecular weight is too small, the elastomer would be poor in the strength properties, flexing resistance and abrasion resistance. On the other hand, if the molecular weight is too large, the processibility of the elastomer would be impaired.

The polyamideimide elastomers of the present invention show excellent heat resistance, mechanical properties, low temperature characteristics and oil resistance and can be easily moulded through conventional injection moulding machines, extrusion moulding machines, blow moulding machines or the like, into sheets, films, tubes, hosepipes, roll gears, packing materials, sound-insulating materials, vibration-proof materials, boots, gaskets, belt laminate products, coating materials, other various kinds of automobile parts, industrial machine parts, sporting goods, etc. Further, the elastomers may be dissolved in various kinds of polar solvent to be used as adhesives, coating agents, binders, paints and varnishes, etc.

The present invention will be specifically described hereinafter with reference to the examples. In the examples, "parts" are all "parts by weight". Tensile strength was measured on specimens obtained by punching a film having a thickness of 100 m obtained by casting with DMF solution, with a dumbbell. Heat aging resistance was evaluated by a keeping rate obtained by measuring the tensile strength of a film having a thickness of 100 μm which had been kept in a gear oven at 180° C. for 7 days. The dynamic viscoelasticity was measured by the use of a direct reading type dynamic viscoelasticity measuring device, Vibron Model DDV-II (110 Hz) made by Toyo Sokki K.K., where a test piece from a film having a thickness of 200 μm of the copolymer of the present invention was tested. For evaluation of the elastic recovery, a film having a thickness of 100 μm was used, and this was kept 10 minutes under 100% elongation and then released for 10 minutes, whereupon the permanent elongation was measured.

SYNTHESIS EXAMPLE 1

Into a reactor were charged 1180 parts (10.0 mols) of 1,6-hexanediol and 1640 parts (11.23 mols) of adipic acid and esterification was initiated at 150° C. with stirring. The temperature was gradually elevated up to 200° C. over about 3 hours to complete the esterification. At this stage, water was distilled out. Then, the reaction was accelerated while gradually reducing the pressure in the system. At the time when terminal hydroxyl groups had almost disappeared, the reaction was terminated to give a carboxy-telechelic polyester (A). As a result, the acid value was 56 KOH mg/g and the average molecular weight determined from the acid value was 2,000.

SYNTHESIS EXAMPLE 2

Carboxyl-telechelic polyesters (B) to (J) as described in Table 1 below were obtained in a manner similar to that of Synthesis Example 1.

SYNTHESIS EXAMPLE 3

1,000 parts of polycaprolactonediol (hydroxyl value 56 KOH mg/g) was charged into a reactor and heated to 80° C., and 100 parts of succinic anhydride was added thereto and reacted for 6 hours to obtain a carboxyl-telechelic polyester (K). The molecular weight was 2,200.

SYNTHESIS EXAMPLE 4

Carboxyl-telechelic polyester (L) as described in Table 1 below was obtained in a manner similar to that of Synthesis Example 3.

TABLE 1

| Carboxyl-telechelic Polyester | Composition | Molecular Weight |
|---|---|---|
| A | Adipic Acid/1,6-Hexanediol | 2,000 |
| B | Adipic Acid/1,9-Nonanediol | 2,400 |
| C | Azelaic Acid/1,4-Butanediol | 1,150 |
| D | Azelaic Acid/1,6-hexanediol | 3,000 |
| E | 1,10-Decanedicarboxylic Acid/1,6-Hexanediol | 2,050 |
| F | Adipic Acid/3-Methyl-1,5-pentanediol | 3,000 |
| G | Adipic Acid/1,9-Nonanediol/2-Methyl-1,8-octanediol | 1,800 |
| H | Azelaic Acid/Neopentyl Glycol/1,6-Hexanediol | 2,400 |
| I | Azelaic Acid/1,9-Nonanediol/2-Methyl-1,8-octanediol | 2,000 |
| J | 3-Methyladipic Acid/1,6-Hexanediol | 2,700 |
| K | Succinic Anhydride/Polycaprolactonediol | 2,200 |
| L | Succinic Anhydride/Polymethylvalerolactonediol | 2,200 |

(Note) The molar ratio of the low molecular diols used in (G), (H) and (I) was 1/1.

SYNTHESIS EXAMPLE 5

A mixture comprising 1,740 parts (10.88 mols) of 1,9-nonanediol and 2,140 parts (10.0 mols) of diphenyl carbonate was charged into a reactor and heated with stirring, and phenol was distilled out of the reaction system at 190° C. The temperature was gradually elevated up to 210° to 220° C., and after almost all the phenol had been distilled out, the remaining phenol was completely distilled out under a vacuum condition of 6 to 10 mmHg. Thus a white solid of a carboxyltelechelic polycarbonate was obtained. 1,000 parts of the carboxyl-telechelic polycarbonate was heated to 80° C. and then 90 parts of succinic anhydride was added thereto and reacted for 6 hours to obtain a carboxyl-telechelic polycarbonate (M). As a result, the acid value was 56 KOH mg/g, and the average molecular weight determined from the acid value was 2,000.

SYNTHESIS EXAMPLE 6

Carboxyl-telechelic polycarbonate (N) was obtained in a manner similar to that of Synthesis Example 5 except that 1,6-hexanediol was used in place of 1,9-nonanediol. The average molecular weight was 2,600.

SYNTHESIS EXAMPLE 7

Carboxyl-telechelic polycarbonate (O) was obtained in a manner similar to that of Synthesis Example 5 except that 1,219 parts (7.62 mols) of 1,9-nonanediol and 522 parts (3.26 mols) of 2-methyl-1,8-octanediol were used. As a result, the acid value was 56 KOH mg/g, and the average molecular weight determined from the acid value was 2,000.

SYNTHESIS EXAMPLE 8

Carboxyl-telechelic polycarbonate (P) was obtained in a manner similar to that of Synthesis Example 5 except that 3-methyl-1,5-pentanediol was used in place of 1,9-nonanediol. As a result, the average molecular weight was 2,400.

SYNTHESIS EXAMPLE 9

1,000 parts of polytetramethylene glycol (hydroxyl value 62 KOH mg/g) was charged into a reactor and heated up to 80° C., and then 90 parts of succinic anhydride was added thereto and reacted for 6 hours to obtain a carboxyl-telechelic polytetramethylene glycol (Q). As a result, the acid value was 56 KOH mg/g and the average molecular weight determined from the acid value was 2,000. 10 parts of Irganox 1098 was added as an antioxidant.

EXAMPLE 1

Figure 2:
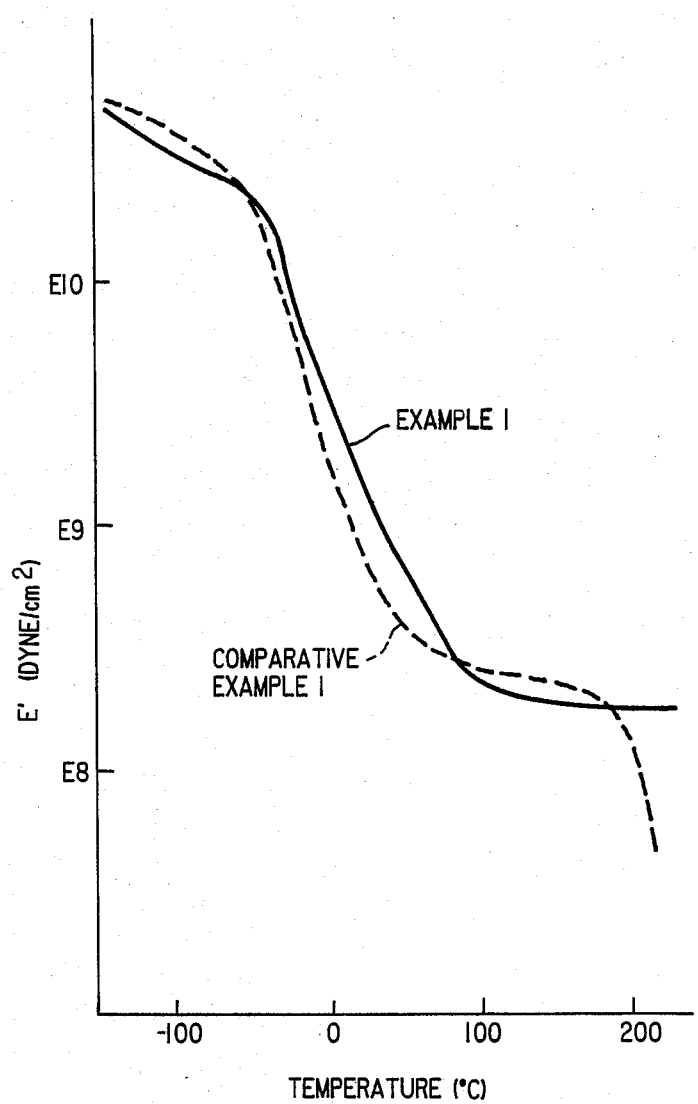
FIG. 2 shows a graph of dynamic viscoelasticity of the polyamideimide elastomer obtained in Example 1 and that of the polyamide elastomer of Comparative Example 1.

A mixture comprising 80 parts (0.04 mol) of the carboxyl-telechelic polyester (A) obtained in Synthesis Example 1, 13.56 parts (0.08 mol) of trimellitic anhydride, 376 parts of tetramethylenesulfone and 0.09 part of 1-methyl-2-phosphorene-1-oxide was charged into a 1 liter beaker and heated up to 200° C. with stirring in a nitrogen atmosphere. Further, 30 parts (0.12 mol) of 4,4'-diphenylmethane diisocyanate was added and reacted for 3 hours. In this stage, the percentage of the remaining isocyanate was 0%, and that of the remaining carboxylic acid and acid anhydride was 0.1%. The said reaction solution was put into 10 liters of methanol for reprecipitation. The precipitate formed was dried under reduced pressure to obtain a pale yellow rubber substance. The intrinsic viscosity of the said rubber substance was 0.82 dl/g at 30° C. in N-methyl-2-pyrrolidone. The molecular weight thereof was about 65,000 (calculated as styrene). The infrared absorption spectrum of the substance showed absorptions derived from imido ring at 1780 cm$^{-1}$, 1720 cm$^{-2}$ and 1380 cm$^{-1}$, absorptions derived from amido group at 1650 cm$^{-1}$ and 1530 cm$^{-1}$ and absorptions derived from ester at 1720 cm$^{-1}$, 1410 cm$^{-1}$ and 1170 cm$^{-1}$, which demonstrated that the rubber substance obtained was a polyamideimide elastomer. The mechanical properties of the polyamideimide elastomer are shown in FIG. 1 and FIG. 2, which show that the breaking strength was 610 kg/cm$^2$ and the breaking elongation was 380%. Thus the elastomer was tough. In addition, the dynamic viscoelasticity is shown in FIG. 2, which demonstrates that the Ta value (E" at 110 Hz) was also low and the elastomer kept the property as an elastomer even at a high temperature. The elastomer film was subjected to a heat resistance test in which the film was kept at 180° C. for 7 days, and this still kept the original mechanical properties even after the test. (Refer to Table 2 below.)

COMPARATIVE EXAMPLE 1

A mixture comprising 80 parts (0.04 mol) of the carboxyl-telechelic polyester (A) obtained in Synthesis Example 1, 15.04 parts (0.08 mol) of azelaic acid, 375 parts of tetramethylenesulfone and 0.09 part of 1-methyl-2-phosphorene-1-oxide was charged into a 1 liter reactor and heated up to 200° C. with stirring in a nitrogen atmosphere. Further, 30 parts (0.12 mol) of 4,4'-diphenylmethane diisocyanate was added and reacted for 3 hours. In this state, the percentage of the remaining isocyanate was 0%, and that of the remaining carboxylic acid was 0.3%. The said reaction solution was put into 10 liters of methanol for reprecipitation to obtain a white polyamide elastomer having a intrinsic viscosity of 0.64dl/g (at 30° C. in N-methyl-2-pyrrolidone). The mechanical properties of the elastomer are shown in FIG. 1 and FIG. 2, which demonstrate that the breaking strength was 180 kg/cm$^2$ and the breaking elongation was 420%. Further, the dynamic viscoelasticity is shown in FIG. 2, which demonstrates that the elastomer could not show the property as an elastomer at a high temperature (200° C.).

EXAMPLES 2 TO 7

Various kinds of polyamideimide elastomers were obtained in a manner similar to that of Example 1 except for using the compositions shown in Table 2 below. The intrinsic viscosities of the thus obtained polyamideimide elastomers were 0.68 to 1.1 dl/g (at 30° C. in N-methyl-2-pyrrolidone). Various properties of the elastomers were evaluated and the results are shown in Table 2.

As was obvious from the results in Table 2, the polyamideimide elastomers obtained in Examples 2 to 7 were all good in both the mechanical properties and the heat resistance.

EXAMPLE 8

A mixture comprising 88 parts (0.04 mol) of the carboxyl-telechelic polyester (K) obtained in Synthesis Example 1, 7.68 parts (0.04 mol) of trimellitic anhydride, 5.64 parts (0.03 mol) of azelaic acid, 2.02 parts (0.01 mol) of sebacic acid, 375 parts of tetramethylenesulfone and 0.15 part of 1-phenyl-2-phosphorene-3-methyl-1-oxide was charged into a 1 liter reactor and heated up to 200° C. with stirring in a nitrogen atmosphere. Further, 30 parts (0.12 mol) of 4,4'-diphenylmethane diisocyanate was added and reacted for 3 hours. In this state, the percentage of the remaining isocyanate was 0% and that of the remaining carboxylic acids and acid anhydride was 0.2%. The said reaction solution was put into 10 liters of methanol for reprecipitation, and the precipitate formed was dried under reduced pressure to obtain a polyamideimide elastomer. This had a intrinsic viscosity of 0.65 dl/g (30° C. in N-methyl-2-pyrrolidone). Various properties of the elastomer were evaluated and the results obtained are shown in Table 2, which demonstrates that the elastomer was good in both the mechanical properties and the heat resistance.

EXAMPLES 9 TO 11

Various kinds of polyamideimide elastomers were obtained in a manner similar to that of Example 8 except for using the compositions shown in Table 2. Various properties of the elastomers obtained were evaluated and the results obtained are shown in Table 2.

As was obvious from the results in Table 2, the polyamideimide elastomers obtained in Examples 9 to 11 were all good in both the mechanical properties and the heat resistance.

EXAMPLES 13 TO 18

Various kinds of polyamideimide elastomers were obtained in a manner similar to that of Example 12 except for using the compositions shown in Table 3 below. Various properties of the elastomers obtained were evaluated and the results are shown in Table 3, which obviously demonstrates that the elastomers had excellent mechanical properties and elastic recovery.

TABLE 2

| Example | Carboxyl-telechelic Polymer (a) | Dicarboxylic Acid (d) | $\frac{c}{c+d} \times 100$ molar ratio | a:b: (c + d) molar ratio | $[\eta]$(dl/g) (30° C..NMP) | Breaking Strength (kg/cm$^2$) | Breaking Elongation (%) | Heat Resistance Keeping Rate of Tensile Strength (%) |
|---|---|---|---|---|---|---|---|---|
| 1 | A | — | 100 | 1:3:2 | 0.82 | 610 | 380 | 100 |
| 2 | B | — | 100 | 1:3:2 | 0.86 | 580 | 400 | 100 |
| 3 | C | — | 100 | 1:2:1 | 0.70 | 520 | 430 | 100 |
| 4 | D | — | 100 | 1:4:3 | 1.00 | 500 | 400 | 100 |
| 5 | E | — | 100 | 1:3:2 | 0.78 | 605 | 370 | 100 |
| 6 | M | — | 100 | 1:3:2 | 0.95 | 635 | 385 | 100 |
| 7 | N | — | 100 | 1:3.5:2.5 | 1.10 | 640 | 360 | 100 |
| 8 | K | SA, AzA | 50 | 1:3:2 | 0.65 | 490 | 415 | 100 |
| 9 | K | AdA | 30 | 1:2.5:1.5 | 0.87 | 420 | 390 | 100 |
| 10 | K | DeA | 85 | 1:3:2 | 0.93 | 605 | 375 | 100 |
| 11 | Q | — | 100 | 1:3:2 | 0.72 | 480 | 420 | 70 |
| Comparative Example 1 | A | AzA | 0 | 1:3:2 | 0.64 | 180 | 420 | 90 |

(a); Carboxyl-telechelic Polymer
(b); 4,4'-Diphenylmethane Diisocyanate
(c); Trimellitic Anhydride
NMP; N—methyl-2-pyrrolidone
(d); Dicarboxylic Acid
SA; Sebacic Acid
AdA; Adipic Acid
AzA; Azelaic Acid
DeA; 1,10-Decanedicarboxylic Acid

EXAMPLE 12

A mixture comprising 120 parts (0.04 mol) of the carboxyl-telechelic polyester (F) obtained in Synthesis Example 2, 15.36 parts (0.08 mol) of trimellitic acid anhydride, 496 parts of tetramethylenesulfone and 0.09 part of 1-methyl-2-phosphorene-1-oxide was charged into a 1 liter reactor and heated up to 200° C. with stirring in a nitrogen atmosphere. Further, 30 parts (0.12 mol) of 4,4'-diphenylmethane diisocyanate was added and reacted for 3 hours. The resulting reaction solution was put into 7 liters of methanol for reprecipitation, and the precipitate formed was dried under reduced pressure to obtain a pale yellow rubber substance. The intrinsic viscosity of the rubber substance was 0.93 dl/g at 30° C. in N-methyl-2-pyrrolidone solvent, and the molecular weight thereof was about 90,000 (calculated as styrene) by GPC measurement. The infrared absorption spectrum of the substance showed absorptions derived from imido ring at 1780 cm$^1$, 1720 cm$^{-1}$ and 1380 cm$^{-1}$, absorptions derived from amido group at 1650 cm$^{-1}$ and 1530 cm$^{-1}$ and absorptions derived from ester group at 1720 cm$^{-1}$, 1410 cm$^{-1}$ and 1170 cm$^{-1}$, which demonstrated that the rubber substance obtained by this process was a polyamideimide elastomer. Various properties of the substance were evaluated and the results are shown in Table 3 below. As was obvious from the results of Table 3, the elastomer of the present invention was good in all the mechanical properties, elastic recovery and heat resistance.

EXAMPLE 19

A mixture comprising 80 parts (0.04 mol) of the carboxyl-telechelic polyester (F) obtained in Synthesis Example 2, 7.68 parts (0.04 mol) of trimellitic anhydride, 5.64 parts (0.03 mol) of azelaic acid, 1.46 parts (0.01 mol) of adipic acid, 375 parts of tetramethylenesulfone and 0.15 part of 1-phenyl-2-phosphorene-3-methyl-1-oxide was charged into a 1 liter reactor and heated up to 200° C. with stirring in a nitrogen atmosphere. Further, 30 parts (0.12 mol) of 4,4'-diphenylmethane diisocyanate was added and reacted for 3 hours. The said reaction solution was put into 10 liters of methanol for reprecipitation, and the precipitate formed was dried under reduced pressure to obtain a polyamideimide elastomer. Various properties of the elastomer were evaluated and the results obtained are shown in Table 3, which demonstrates that the elastomer had excellent mechanical properties, heat resistance and elastic recovery.

EXAMPLES 20 AND 21

Two kinds of polyamideimide elastomers were obtained in a manner similar to that of Example 19 except for using the compositions shown in Table 3. Various properties of the elastomers obtained were evaluated and the results are shown in Table 3, which demonstrates that the elastomers both had excellent mechanical properties, heat resistance and elastic recovery.

TABLE 3

| Example | Carboxyl-telechelic Polymer (a) | Dicarboxylic Acid (d) | $\frac{c}{c+d} \times 100$ molar ratio | a:b: (c + d) molar ratio | $[\eta](dl/g)$ (30° C..NMP) | Breaking Strength (kg/cm$^2$) | Breaking Elongation (%) | Heat Resistance Keeping Rate of Tensile Strength (%) | Elastic Recovery (Permanent Elongation) (%) |
|---|---|---|---|---|---|---|---|---|---|
| 12 | F | — | 100 | 1:3:2 | 1.31 | 545 | 490 | 100 | 4 |
| 13 | G | — | 100 | 1:2.5:1.5 | 1.03 | 590 | 385 | 100 | 3 |
| 14 | H | — | 100 | 1:3.5:2.5 | 1.21 | 610 | 380 | 100 | 5 |
| 15 | J | — | 100 | 1:4:3 | 1.17 | 575 | 400 | 100 | 6 |
| 16 | L | — | 100 | 1:3:2 | 0.99 | 520 | 490 | 100 | 2 |
| 17 | O | — | 100 | 1:3:2 | 1.15 | 580 | 410 | 100 | 4 |
| 18 | P | — | 100 | 1:4:3 | 1.43 | 620 | 365 | 100 | 5 |
| 19 | I | AzA, AdA | 50 | 1:3:2 | 0.93 | 480 | 510 | 100 | 6 |
| 20 | I | SA | 30 | 1:3.5:2.5 | 1.05 | 450 | 380 | 97 | 9 |
| 21 | I | DeA | 80 | 1:2.5:1.5 | 1.27 | 570 | 390 | 100 | 4 |

(a); Carboxyl-telechelic Polymer
(b); 4,4'-Diphenylmethane Diisocyanate
(c); Trimellitic Anhydride
NMP; N—methyl-2-pyrrolidone
(d); Dicarboxylic Acid
SA; Sebacic Acid
AdA; Adipic Acid
AzA; Azelaic Acid
DeA; 1,10-Decanedicarboxylic Acid

What is claimed is:

1. A polyamideimide elastomer substantially comprising structural units of the following (I) through (IV):

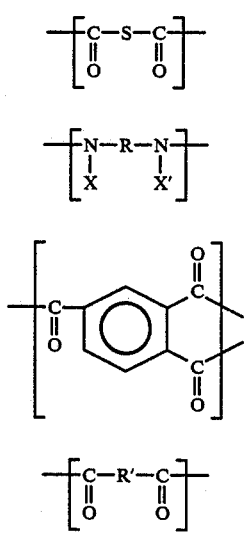

wherein S represents a divalent group derived from one or more carboxyl-telechelic polymers having a molecular weight of 500 to 10,000, by removing the carboxyl groups therefrom; R represents a residue of one or more aromatic hydrocarbons; X and X' each represent a hydrogen atom or a bond, and in the case of a bond, this is bonded to the structural unit (III) to form an imide ring; R' represents a divalent group derived from one or more dicarboxylic acids having 4 to 18 carbon atoms, by removing the carboxyl groups therefrom; and wherein the units (I), (III) and (IV) are necessarily bonded to each other via the structural unit (II), the unit (III) is bonded to the unit (II) to form an imido ring, the total molar number of the units (I)+(III)+(IV) in the said polyamideimide elastomer is substantially equal to the molar number of the unit (II), the unit (I) is 3 to 49 mol % and the sum of the units (III)+(IV) is 1 to 47 mol % on the basis of the total of the units (I) through (IV) of being 100 mol %, and the molar ratio of (III)/(IV) is 10/90 to 100/0.

2. A polyamideimide elastomer as claimed in claim 1 wherein S is a divalent group derived from carboxyl-telechelic polyester(s) having a molecular weight of 800 to 5,000, by removing the carboxyl groups therefrom.

3. A polyamideimide elastomer as claimed in claim 2 wherein the polyester is an aliphatic polyester.

4. A polyamideimide elastomer as claimed in claim 3 wherein the polyester is an aliphatic polyester produced from an aliphatic dicarboxylic acid having 4 to 18 carbon atoms and an aliphatic diol having 2 to 20 carbon atoms.

5. A polyamideimide elastomer as claimed in claim 3 wherein the polyester is an aliphatic polyester produced by ring-opening-polymerization of lactones.

6. A polyamideimide elastomer as claimed in claim 1 wherein S is a divalent group derived from carboxyl-telechelic polycarbonate(s) having a molecular weight of 8000 to 5,000.

7. A polyamideimide elastomer as claimed in claim 6 wherein the polycarbonate is an aliphatic polycarbonate.

8. A polyamideimide elastomer as claimed in claim 1 wherein R' is a divalent group derived from one or more dicarboxylic acids selected from the group consisting of terephthalic acid, isophthalic acid, adipic acid, azelaic acid, sebacic acid and 1,10-decane-dicarboxylic acid, by removing the carboxyl groups therefrom.

9. A polyamideimide elastomer as claimed in claim 1 wherein the unit (I) is 7 to 35 mol %.

10. A polyamideimide elastomer as claimed in claim 1 wherein the ratio of 100×(I)/((I)+(III)+(IV)) is 10 to 90 mol %.

11. A polyamideimide elastomer as claimed in claim 1 wherein the molar ratio of (III)/(IV) is 30/70 to 100/0.

12. A polyamideimide elastomer as claimed in claim 1 wherein the molar ratio of (III)/(IV) is 50/50 to 100/0.

13. A polyamideimide elastomer as claimed in claim 1 wherein R is

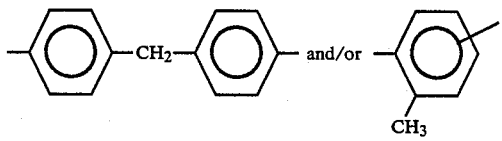

14. A polyamideimide elastomer as claimed in claim 1 wherein the carboxyl-telechelic polymer is one containing side chain-having monomer components in an amount of 5 mol % or more in the said carboxyl-telechelic polymer component.

15. A polyamideimide elastomer as claimed in claim 14 wherein the carboxyl-telechelic polymer is a carboxyltelechelic polyester containing one or more diols selected from the low molecular diols having the following structures, in an amount of 5 mol % or more, $$HO-CH_2-\underset{R_1'}{\overset{R_1}{C}}-CH_2-OH; \quad HO-CH_2CH_2\overset{CH_3}{\underset{}{CH}}CH_2CH_2-OH;$$

$$HO-CH_2-\overset{CH_3}{\underset{}{CH}}(CH_2)_6OH$$

in which $R_1$ and $R_1'$ each represent an alkyl group having 1 to 4 carbon atoms.

16. A polyamideimide elastomer as claimed in claim 14 wherein the carboxyl telechelic polymer is a carboxyltelechelic polycarbonate containing one or more diols selected from the low molecular diols having the following structures, in an amount of 5 mol % or more, $$HO-CH_2-\underset{R_1'}{\overset{R_1}{C}}-CH_2-OH; \quad HO-CH_2CH_2\overset{CH_3}{\underset{}{CH}}CH_2CH_2-OH;$$

$$HO-CH_2-\overset{CH_3}{\underset{}{CH}}(CH_2)_6OH$$

in which $R_1$ and $R_1'$ each represent an alkyl group having 1 to 4 carbon atoms.

17. A polyamideimide elastomer as claimed in claim 14 wherein the carboxyl-telechelic polymer is a carboxyltelechelic polyester containing β-methyl-δ-valerolactone in an amount of 5 mol % or more.

18. A polyamideimide elastomer as claimed in claim 1, which has a number average molecular weight of 5,000 or more.

19. A shaped article obtained from the polyamideimide elastomer as claimed in claim 1.

20. A film obtained from the polyamideimide elastomer as claimed in claim 1.

21. A method of producing a polyamideimide elastomer by reacting the following components:
(a) one or more carboxyl-telechelic polymers having a molecular weight of 500 to 10,000,
(b) one or more aromatic organic diisocyanates,
(c) trimellitic anhydride, and
(d) a dicarboxylic acid having 4 to 18 carbon atoms, in a molar ratio of (c)/(d) of being 10/90 to 100/0.

22. A method of producing a polyamideimide elastomer as claimed in claim 21 wherein the carboxyl-telechelic polymer is a carboxyl-telechelic polyester having a molecular weight of 800 to 5,000.

23. A method of producing a polyamideimide elastomer as claimed in claim 22 wherein the polyester is an aliphatic polyester.

24. A method of producing a polyamideimide elastomer as claimed in claim 23 wherein the polyester is an aliphatic polyester produced from an aliphatic dicarboxylic acid having 4 to 18 carbon atoms and an aliphatic diol having 2 to 20 carbon atoms.

25. A method of producing a polyamideimide elastomer as claimed in claim 23 wherein the polyester is an aliphatic polyester produced by ring-opening-polymerization of lactones.

26. A method of producing a polyamideimide elastomer as claimed in claim 23 wherein the carboxyl-telechelic polymer is a carboxyl-telechelic polycarbonate having a molecular weight of 800 to 5,000.

27. A method of producing a polyamideimide elastomer as claimed in claim 26 wherein the polycarbonate is an aliphatic polycarbonate.

28. A method of producing a polyamideimide elastomer as claimed in claim 21 wherein the dicarboxylic acid having 4 to 18 carbon atoms is one or more dicarboxylic acids selected from the group consisting of terephthalic acid, isophthalic acid, adipic acid, azelaic acid, sebacic acid and 1,10-decane-dicarboxylic acid.

29. A method of producing a polyamideimide elastomer as claimed in claim 21 wherein the proportion of (a) is 3 to 49 mol % to the total of (a) to (d) of being 100 mol %.

30. A method of producing a polyamideimide elastomer as claimed in claim 21 wherein the ratio of the molar number of (b) to the total molar number of (a), (c) and (d) of (b)/((a)+(c)+(d)) is 0.97 to 1.10.

31. A method of producing a polyamideimide elastomer as claimed in claim 21 wherein the ratio of $100 \times (a)/((a)+(c)+(d))$ is 10 to 90 mol %.

32. A method of producing a polyamideimide elastomer as claimed in claim 21 wherein the molar ratio of (c)/(d) is 30/70 to 100/0.

33. A method of producing a polyamideimide elastomer as claimed in claim 21 wherein the molar ratio of (c)/(d) is 50/50 to 100/0.

34. A method of producing a polyamideimide elastomer as claimed in claim 21 wherein the aromatic organic diisocyanate is 4,4'-diphenylmethane diisocyanate and/or tolylene diisocyanate.

* * * * *